(12) United States Patent
Birke

(10) Patent No.: US 9,695,044 B2
(45) Date of Patent: Jul. 4, 2017

(54) METHOD AND DEVICE FOR PRODUCING NITRIC ACID

(71) Applicant: Daniel Birke, Dortmund (DE)

(72) Inventor: Daniel Birke, Dortmund (DE)

(73) Assignee: THYSSENKRUPP INDUSTRIAL SOLUTIONS AG, Essen (DE)

( * ) Notice: Subject to any disclaimer, the term of this patent is extended or adjusted under 35 U.S.C. 154(b) by 249 days.

(21) Appl. No.: 14/371,813

(22) PCT Filed: Dec. 21, 2012

(86) PCT No.: PCT/EP2012/005331
§ 371 (c)(1),
(2) Date: Jul. 11, 2014

(87) PCT Pub. No.: WO2013/107490
PCT Pub. Date: Jul. 25, 2013

(65) Prior Publication Data
US 2014/0377157 A1 Dec. 25, 2014

(30) Foreign Application Priority Data
Jan. 16, 2012 (DE) .................. 10 2012 000 570

(51) Int. Cl.
*B01J 19/24* (2006.01)
*C01B 21/40* (2006.01)
(Continued)

(52) U.S. Cl.
CPC .............. *C01B 21/38* (2013.01); *B01J 19/24* (2013.01); *C01B 21/26* (2013.01);
(Continued)

(58) Field of Classification Search
None
See application file for complete search history.

(56) References Cited

U.S. PATENT DOCUMENTS 2,955,917 A * 10/1960 Kalous .................... C01B 21/26
422/618
3,502,433 A * 3/1970 Hardouin ................ C01B 21/26
423/392
(Continued)

FOREIGN PATENT DOCUMENTS

GB 1 278 828 A 6/1972
WO 01/68520 A1 9/2001
(Continued)

OTHER PUBLICATIONS

INFOMIL: Dutch Notes on BAT for the Production of Nictric Acid.

*Primary Examiner* — Wayne Langel
(74) *Attorney, Agent, or Firm* — thyssenkrupp North America, Inc.

(57) ABSTRACT

An apparatus for starting up and/or shutting down a plant for preparing nitric acid from ammonia and oxygenous gas may include at least one air compressor, at least one process gas cooler, at least one feed water preheater, and at least one residual gas turbine. The at least one process gas cooler and the at least one feed water preheater may include pipe coils, at least one of which is connected to a source for a heating medium such that the at least one pipe coil in the process gas cooler and/or the feed water preheater can be charged during startup and/or shutdown of the apparatus with the heating medium for heating the process gas flowing through the process gas cooler and feed water preheater. The apparatus may further include a heat exchanger downstream of the process gas cooler and/or the feed water preheater for transferring thermal energy from the heated process gas to the residual gas supplied to the residual gas turbine. Corresponding methods are also disclosed.

20 Claims, 3 Drawing Sheets

(51) Int. Cl.
*C01B 21/26* (2006.01)
*C01B 21/38* (2006.01)

(52) U.S. Cl.
CPC .. *B01J 2219/00761* (2013.01); *B01J 2219/24* (2013.01); *C01B 21/40* (2013.01)

(56) References Cited

U.S. PATENT DOCUMENTS

| | | | |
|---|---|---|---|
| 4,869,890 A | 9/1989 | Adams | |
| 5,472,680 A | 12/1995 | Reimer et al. | |
| 6,969,446 B1 | 11/2005 | Dichtl et al. | |
| 7,118,723 B2 | 10/2006 | Maurer | |
| 2003/0143148 A1* | 7/2003 | Maurer | C01B 21/26 423/392 |
| 2004/0105803 A1 | 6/2004 | Schwefer et al. | |
| 2011/0002836 A1* | 1/2011 | Dubois | C01B 21/26 423/392 |
| 2013/0336872 A1 | 12/2013 | Schwefer et al. | |

FOREIGN PATENT DOCUMENTS

| | | |
|---|---|---|
| WO | 2009/146758 A1 | 12/2009 |
| WO | 2011/054928 A1 | 5/2011 |

* cited by examiner

METHOD AND DEVICE FOR PRODUCING NITRIC ACID

CROSS REFERENCE TO RELATED APPLICATIONS

This application is a U.S. National Stage Entry of, and claims priority to, International Patent Application No. PCT/EP2012/005331, filed Dec. 21, 2012.

FIELD

The present invention relates to a process for preparing nitric acid, in the course of which, in the startup and shutdown of the plant, a selected control method is used. The invention also relates to a correspondingly modified plant for preparation of nitric acid. The process according to the invention and the inventive plant permit problem-free startup and shutdown of nitric acid plants, including those plants equipped with high-performance residual gas expanders.

BACKGROUND

Nitric acid is an important commodity in the chemical industry and serves, for example, as the basis for production of fertilizers, explosives, and for nitration of organic substances in the production of dyes and disinfectants.

Since the early 20th century, nitric acid has been produced by the Ostwald process, on which large-scale industrial production has been based to date. This reaction is a catalytic reaction of ammonia. The nitrogen monoxide formed reacts to give nitrogen dioxide, from which reaction with water forms nitric acid which can be removed in trickle towers. This process is described in the publication "Anorganische Stickstoffverbindungen" [Inorganic Nitrogen Compounds] by Mundo/Weber, Carl Hanser Verlag Munich Vienna 1982, and in WO 01/68520 A1.

For preparation of nitric acid, ammonia $NH_3$ is generally first reacted with air to obtain nitrogen oxide NO, which is then oxidized up to nitrogen dioxide $NO_2$.

Subsequently, the nitrogen dioxide $NO_2$ thus obtained is absorbed in water to form nitric acid. In order that a maximum amount of the nitrogen dioxide $NO_2$ obtained is absorbed by water, the absorption is effected generally at elevated pressure, preferably at pressures between 4 and 14 bar.

The oxygen required for the conversion of the ammonia used as the raw material is generally supplied in the form of atmospheric oxygen. For the purpose of supply, the process air is compressed in a compressor and brought to a pressure appropriate both for the oxidation reaction and the absorption reaction.

Typically, the energy for compression of the air is obtained firstly by means of decompression of the residual gas leaving the absorption to ambient pressure in a residual gas expander, and secondly through the utilization, of the heat released in the reactions. The nitric acid plants constructed in various designs are matched to the specific requirements for the site of each one.

The preparation of nitric acid can be effected in a single pressure process or in a dual pressure process. In the single pressure process, both the combustion and the absorption are conducted at moderate pressure (<8 bar) or high pressure (>8 bar).

Single pressure processes are used especially when the required daily production is low. In these cases, the nitric acid plant is preferably operated by the mono high pressure process or by the mono medium pressure process. In the mono high pressure process, the combustion of the ammonia and the absorption of the nitrogen oxides are effected at about the same pressure of >8 bar. The advantage of the mono high pressure process is that a compact design is ensured.

In the mono medium pressure process, the combustion of the ammonia and the absorption of the nitrogen oxides are effected at about the same pressure of <8 bar. The advantage of the mono medium pressure process is that an optimal combustion yield is ensured.

If, in contrast, high nominal capacities and/or relatively high acid concentrations are required, a nitric acid plant executed by the dual pressure process is the more economical solution. In the dual pressure process, the combustion of the ammonia used is accomplished at a first pressure, namely at a lower pressure compared to the absorption pressure. The nitrous gases formed in the combustion are generally brought to the second pressure, the absorption pressure, after cooling by means of nitrous gas compression. The advantage of the dual pressure process is that the pressure stages are appropriate for the respective reactions and thus both an optimal combustion yield and a compact absorption are ensured.

In general, the plants for performance of the processes discussed above comprise at least one air compressor and at least one expansion turbine for the residual gas (also called "residual gas turbine").

Such plants are known, for example, from WO 2009/146758 A1 and WO 2011/054928 A1.

In contrast to steady-state operation, in the startup and shutdown operation of nitric acid plants, the units present do not work under standard conditions and frequently require additional regulation.

In the course of startup from the switched-off/cold state, the nitric acid plant is generally first filled with air with the import of outside energy (for example outside steam or power) ("air operation"). The first emissions of $NO_x$ arise as soon as the absorption tower is filled with nitric acid from a reservoir vessel during the startup operation and the nitrogen oxides present in the acid are blown out by the air, and in modern plants the $NO_x$ formed during the filling operation is emitted. With the ending of the filling operation, the $NO_x$ emission then also ceases at first, until the $NH_3$ oxidation in the nitric acid plant is started ("ignited"). After the ignition, the temperature and $NO_x$ concentration in the plant rise constantly to the steady-state operation value, and the individual plant parts can be operated as planned from a particular time.

In the shutdown of the nitric acid plant, the $NH_3$ oxidation is first stopped. The $NO_x$ concentration at the outlet from the absorption tower decreases constantly and the temperature falls in parallel thereto. Here too, from a certain time, individual plant parts can no longer be operated as planned since the steady-state operation values can no longer be complied with.

It is known from Dutch Notes on BAT for the Production of Nitric Acid, Final Report, Ministry of Housing, Spatial Planning and the Environment: The Hague, NL, 1999 that $NO_x$ emissions during startup and shutdown can be reduced by heating the residual gas. In addition, it is suggested to the person skilled in the art that this can be achieved by means of a steam heater.

In the operation of the nitric acid plant, it is desirable to achieve a high efficiency of the residual gas turbine in order to lower the operating costs. For this purpose, the inlet temperature of the medium which flows through the residual gas turbine during the startup or shutdown operation of the plant must be sufficiently high that the gases leaving the residual gas turbine do not freeze. Especially in the case of residual gas turbines with high efficiency, there is an increased risk of freezing, since a residual gas turbine with improved efficiency cools the medium which flows through it much more significantly for the same inlet temperature compared to a conventional residual gas turbine.

In contrast to normal operation of the plant, the inlet temperature of the medium flowing through the residual gas turbine is usually lower during startup and/or shutdown.

Therefore, the efficiency of the residual gas turbine is limited by the medium flowing through it in the course of startup and/or shutdown in order to prevent the freezing of the residual gas turbine during startup and/or shutdown.

Especially in the case of plants comprising residual gas turbines with particularly high efficiency, it is necessary, at least during the startup and shutdown phases of the plant, to heat the medium which is present on the residual gas side and is fed into the residual gas turbine.

SUMMARY

It is an object of the present invention to optimize the known single pressure and dual pressure processes for preparation of nitric acid such that the problems detailed above in the course of startup or shutdown of these plants can be avoided. It is a further object of the invention to provide plants for performance of such processes and to enable use of residual gas turbines with higher efficiency in order thus to lower the operating costs.

A further advantage of the present invention is that, when using a conventional expander, colorless startup of nitric acid plants can be enabled because the residual gas is heated to such an extent that the residual gas purification can be started at an early stage.

In one example, a process is disclosed for startup and/or shutdown of a plant for preparation of nitric acid from ammonia and oxygenous gas by the single pressure or dual pressure process, in which the ammonia used is oxidized by means of compressed process air over a catalyst, said process air having been compressed in at least one compressor, the nitrous gas formed by the combustion is cooled in one or more process gas coolers equipped with pipe coils for a cooling medium and in one or more feed water preheaters equipped with pipe coils for a cooling medium, and the cooled nitrous gas is subsequently absorbed at least partly by water, forming nitric acid, and the unabsorbed residual gas is expanded in at least one residual gas turbine for the purpose of recovering compressor work. In the process, a process gas flowing through the process gas cooler and the feed water preheater during the startup and/or shutdown of the nitric acid plant is heated in the process gas cooler and/or in the feed water preheater by charging at least one of the pipe coils in the process gas cooler and/or in the feed water preheater with a heating medium, and the heated process gas is guided through at least one heat exchanger connected downstream of the process gas cooler and/or the feed water preheater, in order to transfer thermal energy from the heated process gas to the residual gas which is supplied to the at least one residual gas turbine.

Also disclosed, at least in one example, is an apparatus for performing the process according to the invention, comprising at least one air compressor, at least one process gas cooler, at least one feed water preheater and at least one residual gas turbine, the process gas cooler and the feed water preheater comprising pipe coils, at least one of the pipe coils being connected to a source for a heating medium, such that the at least one of the pipe coils in the process gas cooler and/or in the feed water preheater can be charged during the startup and/or shutdown of the apparatus with the heating medium for heating the process gas flowing through the process gas cooler and feed water preheater, and at least one heat exchanger being connected downstream of the process gas cooler and/or the feed water preheater in order to transfer thermal energy from the heated process gas to the residual gas which is supplied to the residual gas turbine.

These measures and apparatuses can effectively avoid freezing of the residual gas turbine.

BRIEF DESCRIPTION OF THE DRAWINGS

The present disclosure is described in detail below with reference to the attached drawing figures.

DETAILED DESCRIPTION

Figure 1:
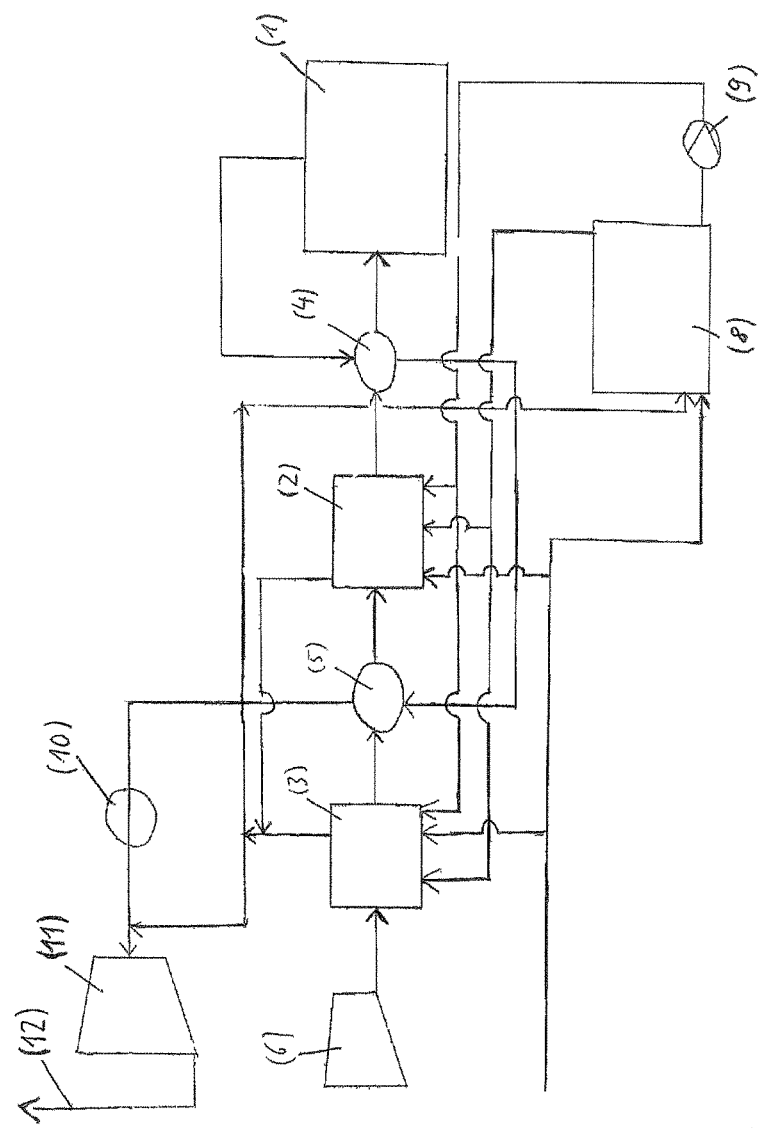
FIG. 1 is a schematic diagram depicting an embodiment of a portion of a nitric acid plant and an embodiment of a process for production of nitric acid, as disclosed herein.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a process for startup and/or shutdown of a plant for preparation of nitric acid from ammonia and oxygenous gas by the single pressure or dual pressure process, in which the ammonia used is oxidized by means of compressed process air over a catalyst, said process air having been compressed in at least one compressor (6), the nitrous gas formed by the combustion is cooled in one or more process gas coolers (3) equipped with pipe coils for a cooling medium and in one or more feed water preheaters (2) (also called "economizers") equipped with pipe coils for a cooling medium, and the cooled nitrous gas is subsequently absorbed at least partly by water, forming nitric acid, and the unabsorbed residual gas is expanded in at least one residual gas turbine (11) for the purpose of recovering compressor work.

In the process according to the invention, a process gas, especially air, flowing through the process gas cooler (3) and the feed water preheater (2) during the startup and/or shutdown of the nitric acid plant is heated in the process gas cooler (3) and/or in the feed water preheater (2) by charging at least one of the pipe coils in the process gas cooler (3) and/or in the feed water preheater (2) with a heating medium, and the heated process gas is guided through at least one heat exchanger (5, 4) connected downstream of the process gas cooler (3) and/or the feed water preheater (2), in order to transfer thermal energy from the heated process gas to the residual gas which is supplied to the at least one residual gas turbine (11).

In the process according to the invention, in the startup and/or in the shutdown of the plant, a residual gas which flows through the residual gas turbine(s) (11) has been heated by heat exchange with the heated process gas which has flowed through the at least one process gas cooler (3) and/or the at least one feed water preheater (2).

Thus, in the present invention, the medium present on the residual gas side, i.e. the residual gas, is heated indirectly with the aid of the process gas cooler (3) present in the plant and/or with the aid of the economizer (2) present in the plant and heat exchangers (5, 4) connected downstream of each.

In the startup and shutdown operation, both the process gas cooler(s) (3) and the economizer(s) (2) are operated in reverse sequence; this means that the actual function as a cooler of the process gas (i.e. air in the case of air operation) is not implemented; instead, these apparatuses, in contrast, are intermittently connected as heaters of the process gas.

A typical process gas cooler (3) has various pipe coils in the interior, by means of which the coolant is transported (18, 19, 20) in steady-state operation. These are, for example, pre-evaporator pipe coils (18), preheater pipe coils (19) and evaporator pipe coils (20). Optionally, parts of these pipe coils can be dispensed with and/or the sequence of arrangement of these pipe coils can vary.

In steady-state operation, the process gas flows through the interior of the process gas cooler (3) and releases some of its thermal energy to the coolant in the pipe coils (18, 19, 20). In the startup and shutdown operations of the plants, rather than a coolant, a heat carrier fluid can be passed through these pipe coils (18, 19, 20), which heats rather than cools the fluid in the interior of the process gas cooler (3). In this case, individual, a plurality of or all of these pipe coils (18, 19, 20) may be charged with the heat carrier fluid. In an alternative variant, the process gas cooler (3) can also be equipped with additional pipe coils (21) through which heating medium is passed in the startup and shutdown operations of the plant, in which case such a heating medium is likewise passed through the other pipe coils (18, 19, 20) or the other pipe coils (18, 19, 20) are shut down or operated with the medium present from steady-state operation. In any case, in startup and shutdown operations, in accordance with the invention, the process gas flowing through the process gas cooler (3) must be heated.

For this purpose, additional and/or existing pipe coils or parts thereof (18, 19, 20, 21) in the process gas cooler (3) may be connected during the startup and/or shutdown operation to sources for heating media, for example charged with hot heating media supplied from the outside, for example with superheated or saturated steam supplied. As a result, the temperature of the process gas flowing through the process gas cooler(s) (3) present on the NO gas side (generally air in the case of startup) is increased. The heated process gas (for example air) then releases its thermal energy to the residual gas side in a downstream heat exchanger (5), as a result of which the residual gas from the residual gas side is heated to the inlet temperature required by the at least one residual gas turbine (11).

In a preferred embodiment of the process according to the invention, for the purpose of improved heat transfer, not only the additional pipe coils (21) but also the existing pipe coils (18, 19, 20) of the process gas cooler (3) are heated during the startup and/or shutdown operation with saturated steam and/or with boiling water from a steam drum (8) and/or from an external system. For this purpose, the steam drum (8) and/or the external system has to be put into operation prior to the startup and/or shutdown, which can be accomplished, for example, by the feeding of imported steam. The boiling water is then conveyed prior to and during the startup and/or shutdown operation preferably through the evaporator pipe coils (20) and/or to the pre-evaporator pipe coils (18). The superheater pipe coils (19) of the process gas cooler (3) can additionally be heated with superheated steam or with saturated steam. As a result, the process gas (for example air) which flows through the process gas cooler (3) during the startup and/or shutdown operation is likewise heated. The heated process gas (for example air) then releases its thermal energy to the residual gas side in a downstream heat exchanger (5), as a result of which the residual gas on the residual gas side is heated. Thus, the amount of heat which is transferred from the process gas (for example air) on the NO gas side to the residual gas side is also increased.

A typical economizer (2) generally has, in the interior, at least one group of pipe coils (24) through which, in steady-state operation, the feed water to be heated is transported. This is generally tank feed water. In steady-state operation, the process gas flows through the interior of the economizer (2) and releases some of its thermal energy to the feed water in the pipe coils (24). In the startup and shutdown operations of the plant, the coolant passed through these pipe coils (24), rather than the feed water, may be heat carrier fluid, which heats rather than cools the process gas in the interior of the economizer (2). In this case, individual, a plurality of or all of these pipe coils (24) may be charged with the heat carrier fluid. In an alternative variant, the economizer may also be equipped with additional pipe coils (25) through which a heating medium is passed in the startup and shutdown operations of the plant, in which case such a heating medium is likewise passed through the other pipe coils (24) or the other pipe coils (24) are shut down or operated with the medium present from the steady-state operation. In any case, in startup and/or shutdown operation, in accordance with the invention, preference is given to heating the process gas flowing through the economizer (2).

For this purpose, in a further preferred variant of the process according to the invention, additional and/or existing pipe coils (24, 25) in the economizer (2) may be charged during the startup and/or shutdown operation with medium supplied hot, for example with superheated or saturated (external) steam, as a result of which the temperature of the process gas present on the NO gas side is increased. As a result, the process gas (for example air) which flows through the economizer (2) during the startup and/or shutdown operation is heated. The heated process gas (for example air) then releases its thermal energy to the residual gas side in a downstream heat exchanger (4), as a result of which the residual gas on the residual gas side is preheated and is more preferably heated to the inlet temperature required by the at least one residual gas turbine (11) with thermal energy from the process gas cooler (3) in a downstream stage.

In a particularly preferred embodiment of the process according to the invention, for the purpose of ensuring good heat transfer, as well as the additional pipe coils (25), the existing pipe coils (24) of the economizer (2) are also heated during the startup operation with saturated steam and/or boiling water from the steam drum (8) and/or from an external system. For the purpose, the steam drum (8) and/or the external system must be put into operation prior to the startup and/or shutdown, which can be accomplished, for example, by the feeding of imported steam. The water is then conveyed through the pipe coils (24, 25) of the economizer (2) prior to and during the startup and/or shutdown operation. As a result, the process gas (for example air) which flows through the economizer (2) during the startup operation is likewise heated. The heated process gas (for example air) then releases its thermal energy to the residual gas side in a downstream heat exchanger (4), as a result of which the residual gas on the residual gas side is heated. Thus, the amount of heat which is transferred from the process gas (for example air) on the NO gas side to the residual gas side is increased.

More preferably, all of the pipe coils in the process gas cooler (3) and/or in the feed water preheater (2) are charged with a heating medium during the startup and/or shutdown of the plant.

Further preferred embodiments of the process according to the invention relate to another improvement in exploitation of the energy content of the heat carrier fluid used in the process gas cooler (3) or economizer (2).

Since the heating medium, for example steam, does not release all of the energy present therein in the pipe coils (18, 19, 20, 21, 24, 25) in the process gas cooler (3) or in the economizer (2), the heating medium from the process gas cooler (3) or from the economizer (2) is added to the residual gas on the residual gas side upstream of entry into the at least one residual gas turbine (11), or the heating medium is added to the steam drum (8); as a result, the residual energy present in the heating medium can be utilized.

In a further preferred variant of the process according to the invention, a heat exchanger (10) installed on the residual gas side upstream of entry into the at least one residual gas turbine (11) is operated, for example, with a hot heat carrier fluid, for example with steam, in order to heat the residual gas on the residual gas side of the nitric acid plant to the required inlet temperature for the residual gas turbine (11) during the startup and/or shutdown operation.

The mode of operation of the nitric acid plant according to the invention is effected principally in the startup and/or shutdown phase of the plant, especially in the startup phase. During steady-state operation, the measures of the process according to the invention are not required.

As a result of the process according to the invention, nitric acid is produced with a concentration in the range from 40 to 76% from ammonia and oxygenous gas by the single pressure or dual pressure process, in which the combustion of the ammonia used is accomplished by means of compressed process air which has been compressed in at least one compressor.

The nitrous gas formed by the combustion is at least partly absorbed by water, which forms nitric acid. For the purpose of recovery of compressor work, the unabsorbed residual gas is expanded in one or else more than one residual gas turbine (11), also called gas expanders, preferably to ambient pressure.

A preferred embodiment of the process according to the invention is performed in a nitric acid plant which has an absorption tower for absorption of the nitrous gas formed by the combustion in water for the purpose of formation of nitric acid, and a downstream residual gas purification and one or more downstream residual gas turbines, and, during the startup and/or shutdown operation of the nitric acid plant; a process gas flows through the process gas cooler (3) and the economizer (2) and is heated in the process gas cooler (3) and/or in the economizer (2), the heated process gas releases its thermal energy to the residual gas side in one or more downstream heat exchangers (5, 4), as a result of which the residual gas on the residual gas side is heated between absorption tower and residual gas purification. This measure enables earlier implementation of the residual gas purification in the case of startup, or delayed shutdown of the residual gas purification in the case of shutdown, as a result of which colorless startup and/or shutdown is possible.

The oxygenous gas used is frequently air, but it may also be advantageous to use oxygen-enriched air.

The invention relates especially to a process which is performed in a plant comprising at least one residual gas turbine (11) having at least two stages.

The invention relates especially to a process which is performed in a plant comprising at least one absorption unit for absorption of nitrous gas in water.

The invention further provides an apparatus for performance of a process as described above.

This apparatus comprises at least one air compressor (6), at least one process gas cooler (3), at least one feed water preheater (2) and at least one residual gas turbine (11), the process gas cooler (3) and/or the feed water preheater (2), as well as the pipe coils (18, 19, 20, 24) provided for steady-state operation, optionally also comprising additional pipe coils (21, 25), at least one of the pipe coils (18, 19, 20, 21, 24, 25) being connected to a source for a heating medium, such that at least one of the pipe coils (18, 19, 20, 21, 24, 25) can be charged during the startup and/or shutdown of the apparatus with the heating medium for heating the process gas flowing through the process gas cooler (3) and/or feed water preheater (2), and at least one heat exchanger (5, 4) being connected downstream of the process gas cooler (3) and/or the feed water preheater (2) in order to transfer thermal energy from the heated process gas to the residual gas which is supplied to the at least one residual gas turbine (11).

In a preferred variant of the inventive apparatus, the process gas cooler (3) and/or the feed water preheater (2), as well as the pipe coils (18, 19, 20, 24) provided for steady-state operation, also has additional pipe coils (21, 25), and the additional pipe coils (21, 25) are connected to a source for a heating medium, preferably to a steam drum (8) and/or an external system, such that the additional pipe coils (21, 25) can be charged during the startup and/or shutdown of the apparatus with the heating medium for heating the process gas flowing through the process gas cooler (3) and/or the feed water preheater (2).

In a further preferred variant of the inventive apparatus, the process gas cooler (3) and/or the feed water preheater (2) has only the pipe coils (18, 19, 20, 24) provided for steady-state operation, and these pipe coils (18, 19, 20, 24) are connected to a source for a heating medium, preferably to a steam drum (8) and/or an external system, such that these pipe coils can be charged during the startup and/or shutdown of the apparatus with the heating medium for heating of the process gas flowing through the process gas cooler (3) and/or the feed water preheater (2).

In a further preferred variant of the inventive apparatus, all of the pipe coils (18, 19, 20, 24) provided for steady-state operation and all of the additional pipe coils (21, 25) optionally present are connected to a source for a heating medium, such that these pipe coils can be charged during the startup and/or shutdown of the apparatus with a heating medium for heating the process gas flowing through the process gas cooler (3) and/or feed water preheater (2).

In a further preferred variant of the inventive apparatus, the thermal energy obtained in the heat exchanger (5, 4) is transferred to the residual gas side between absorption tower and residual gas purification of the nitric acid plant.

With the aid of the process according to the invention or of the inventive apparatus, it is possible to start up and shut down plants for preparation of nitric acid in a rapid and material-protective manner without any risk of freezing of the residual gas turbine(s) (11). Especially in the case of use of residual gas turbines (11) with high efficiency, the process according to the invention offers a high degree of operational reliability since freezing of the residual gas turbines (11) can be reliably avoided. In addition, the invention enables earlier startup or later shutdown of the residual gas purification, which allows colorless startup and shutdown.

FIG. 1 shows an non-detailed rendering of part of a nitric acid plant (1), and an economizer (2), process gas cooler (3), heat exchangers (4, 5, 10), a residual gas turbine (11), a chimney (12) and a steam drum (8), pump (9), and an air compressor (6). On startup of the plant, air from the air compressor (6) is heated by means of the process gas cooler (3) and the economizer (2) and introduced into the part of the plant (1). Thermal energy is withdrawn from the heated air in the heat exchangers (4, 5) and supplied to the residual gas side. The residual gas side can be heated further by means of heat exchangers (10). The heat carrier fluid for heating of the air in the process gas cooler (3) and in the economizer (2) may originate from the steam drum (8) and/or from an external system and is supplied by a pump (9) to the pipe coils which are not shown. The cooled heat carrier fluid from the process gas cooler (3) and the economizer (2) is supplied to the residual gas turbine (11) and/or to the steam drum (8). The steam drum (8) can also be supplied with external steam or another hot fluid.

Figure 2:
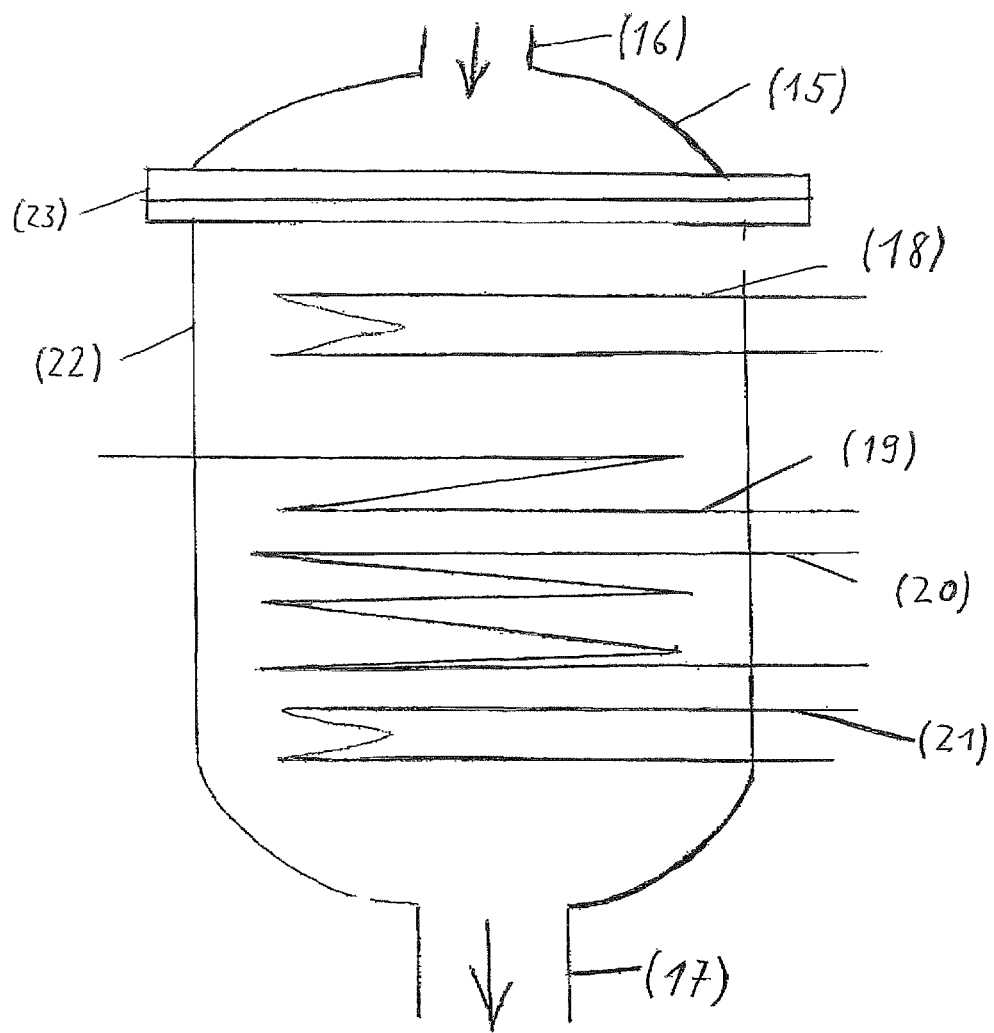
FIG. 2 is a side cross-sectional view of an embodiment of a process gas cooler of the present disclosure.

FIG. 2 shows a process gas cooler in longitudinal section. This shows the casing (22) with outlet (17), and the lid (15) with an inlet (16) for the process gas flowing through the interior. The lid (15) and casing (22) are connected by a flange (23). Within the process gas cooler are pre-evaporator pipe coils (18), superheater pipe coils (19), evaporator pipe coils (20) and additional pipe coils (21) for preheating. The additional pipe coils (21) are used principally during the startup and/or shutdown of the plant and are charged with heating medium. Pre-evaporator pipe coils (18), superheater pipe coils (19) and evaporator pipe coils (20) can be charged with heating medium during the startup and/or shutdown of the plant. In steady-state operation, these pipe coils are charged with cooling medium.

Figure 3:
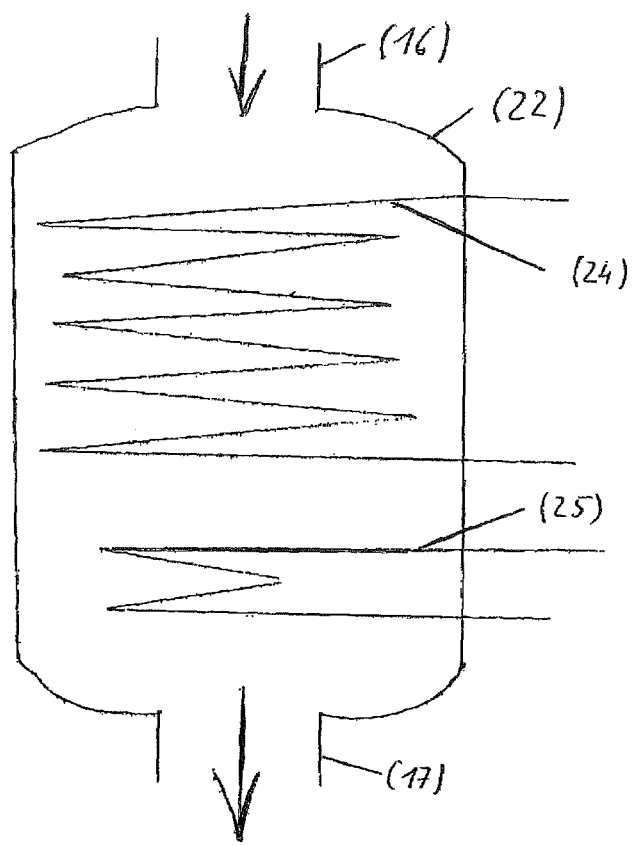
FIG. 3 is side cross-sectional view of an embodiment of an economizer of the present disclosure.

FIG. 3 shows an economizer in longitudinal section. This shows the casing (22) with an inlet and outlet (16, 17) for the flowing process gas. Within the economizers are pipe coils (24) for the heating of the process gas flowing through the interior and additional pipe coils (25) for further heating of the process gas flowing through the interior. The additional pipe coils (25) are used principally during the startup and/or shutdown of the plant and are charged with heating medium. The pipe coils (24) can be charged with heating medium during the startup and/or shutdown of the plant. In steady-state operation, these pipe coils (24) are charged with tank feed water which is heated by the hot NO gas flowing through the economizer.

The invention claimed is:

1. A process for startup and/or shutdown of a plant for preparation of nitric acid from ammonia and oxygenous gas by a single pressure or dual pressure process, in which the ammonia used is oxidized by means of compressed process air over a catalyst, said process air having been compressed in at least one compressor, nitrous gas formed by combustion is cooled in one or more process gas coolers equipped with pipe coils for a cooling medium and in one or more feed water preheaters equipped with pipe coils for a cooling medium, and the cooled nitrous gas is subsequently absorbed at least partly by water, forming nitric acid, and unabsorbed residual gas is expanded in at least one residual gas turbine for a purpose of recovering compressor work, wherein a process gas flowing through the one or more process gas coolers and the one or more feed water preheaters during the startup and/or shutdown of the nitric acid plant is heated in the one or more process gas coolers and/or in the one or more feed water preheaters by charging at least one of the pipe coils in the one or more process gas coolers and/or in the one or more feed water preheaters with a heating medium, and the heated process gas is guided through at least one heat exchanger connected downstream of the one or more process gas coolers and/or the one or more feed water preheaters, thereby transferring thermal energy from the heated process gas to the residual gas that is supplied to the at least one residual gas turbine.

2. The process as claimed in claim 1, wherein the pipe coils in the one or more process gas coolers are charged during startup with a hot heating medium supplied from an external source, as a result of which a temperature of the process gas flowing through the one or more process gas coolers present on a NO gas side is increased, and the heated process gas then releases its thermal energy to a residual gas side in the at least one downstream heat exchanger, as a result of which the residual gas on the residual gas side is heated to an inlet temperature required by the at least one residual gas turbine.

3. The process as claimed in claim 2, wherein the hot heating medium supplied from the external source is superheated or saturated steam.

4. The process as claimed in claim 2, wherein the one or more process gas coolers includes pre-evaporator pipe coils, superheater pipe coils, and/or evaporator pipe coils for steady-state operation, and also includes additional pipe coils, wherein the additional pipe coils and the pre-evaporator, superheater and/or evaporator pipe coils are heated during startup and/or shutdown with saturated steam and/or with boiling water from a steam drum and/or from an external system, wherein the boiling water, prior to and during startup and/or shutdown of the nitric acid plant, is conveyed through the evaporator pipe coils and/or the pre-evaporator pipe coils, wherein the superheater pipe coils of the one or more process gas coolers are further heated with superheated steam or with saturated steam.

5. The process as claimed in claim 2, wherein the one or more process gas coolers includes pre-evaporator, superheater, and/or evaporator pipe coils for steady-state operation, which are heated during startup and/or shutdown with saturated steam and/or with boiling water from a steam drum and/or from an external system, wherein the boiling water, prior to and during startup and/or shutdown of the nitric acid plant, is conveyed through the evaporator pipe coils and/or the pre-evaporator pipe coils, wherein the superheater pipe coils of the one or more process gas coolers are further heated with superheated steam or saturated steam.

6. The process as claimed in any of claims 1 to 5, wherein the pipe coils of the one or more feed water preheaters are for steady-state operation, the one or more feed water preheaters further comprising additional pipe coils, wherein the additional pipe coils and/or those provided for steady-state operation in the one or more feed water preheaters is charged during startup and/or shutdown with a heating medium supplied hot, as a result of which a temperature of the process gas present on the NO gas side is increased, and the heated process gas releases its thermal energy to the residual gas side in the at least one downstream heat exchanger, as a result of which the residual gas on the residual gas side is preheated.

7. The process as claimed in claim 6, wherein the residual gas preheated on the residual gas side is heated to the inlet temperature required by the at least one residual gas turbine with thermal energy from the one or more process gas coolers in a downstream stage.

8. The process as claimed in any of claims 1 to 5, wherein the pipe coils of the one or more feed water preheaters are for steady-state operation and are charged during startup and shutdown with the heating medium supplied hot, as a result of which the temperature of the process gas present on the NO gas side is increased, and the heated process gas releases its thermal energy to the residual gas side in the at least one downstream heat exchanger, as a result of which the residual gas on the residual gas side is preheated.

9. The process as claimed in claim 8, wherein the residual gas preheated on the residual gas side is heated to the inlet temperature required by the at least one residual gas turbine with thermal energy from the process gas cooler in a downstream stage.

10. The process as claimed in claim 6, wherein the additional pipe coils, and the pipe coils of the one or more feed water preheaters provided for steady-state operation are heated during startup with the saturated steam and/or with the boiling water from the steam drum and/or from the external system, as a result of which the process gas that flows through the one or more feed water preheaters during startup is heated, and then releases its thermal energy to the residual gas side in the at least one downstream heat exchanger, as a result of which the residual gas on the residual gas side is heated.

11. The process as claimed in any of claims 1 to 5 or claim 7, wherein the heating medium passed through the pipe coils of the one or more process gas coolers and/or of the one or more feed water preheaters is added to the residual gas on the residual gas side prior to entry into the at least one residual gas turbine, or the heating medium passed through the pipe coils of the one or more process gas coolers and/or of the one or more feed water preheaters is added to the steam drum.

12. The process as claimed in any of claim 1 to 5, 7, 9, or 10, wherein the at least one heat exchanger is installed on the residual gas side upstream of entry into the at least one residual gas turbine and is operated with a hot heat carrier fluid to heat the residual gas on the residual gas side of the nitric acid plant, at least during startup and shutdown, to the required inlet temperature for the residual gas turbine.

13. The process as claimed in any of claim 1 to 5, 7, 9, or 10, which is performed in a plant comprising at least one absorption unit for absorption of nitrous gas in water.

14. The process as claimed in any of claim 1 to 5, 7, 9, or 10, which is performed in a nitric acid plant that has an absorption tower for absorption of the nitrous gas formed by the combustion in water for forming nitric acid, and a downstream residual gas purification and one or more downstream residual gas turbines, wherein during startup and/or shutdown of the nitric acid plant, a process gas flows through the one or more process gas coolers and the one or more feed water preheaters and is heated in the one or more process gas coolers and/or in one or more feed water preheaters, the heated process gas releases its thermal energy to the residual gas side in the one or more downstream heat exchangers, as a result of which the residual gas on the residual gas side is heated between the absorption tower and the residual gas purification.

15. An apparatus for performing the process as claimed in claim 1, comprising at least one air compressor, at least one process gas cooler, at least one feed water preheater, and at least one residual gas turbine, the at least one process gas cooler and the at least one feed water preheater comprising pipe coils, at least one of the pipe coils being connected to a source for a heating medium such that the at least one of the pipe coil in the at least one process gas cooler and/or in the at least one feed water preheater can be charged during startup and/or shutdown of the apparatus with the heating medium for heating a process gas flowing through the at least one process gas cooler and the at least one feed water preheater, wherein at least one heat exchanger is connected downstream of the at least one process gas cooler and/or the at least one feed water preheater and configured to transfer thermal energy from the heated process gas to the residual gas that is supplied to the at least one residual gas turbine.

16. The apparatus as claimed in claim 15, wherein the pipe coils of the at least one process gas cooler and/or the at least one feed water preheater are provided for steady-state operation, wherein the at least one process gas cooler and/or the at least one feed water preheater further comprises additional pipe coils connected to a source for a heating medium, such that the additional pipe coils can be charged during startup and/or shutdown of the apparatus with the heating medium for heating of the process gas flowing through the at least one process gas cooler and/or the at least one feed water preheater.

17. The apparatus as claimed in claim 16, wherein the source for the heating medium is a steam drum and/or an external system.

18. The apparatus as claimed in either of claim 15 or 17, wherein the pipe coils of the at least one process gas cooler and/or the at least one feed water preheater are for steady-state operation and are connected to the source for the heating medium such that the pipe coils can be charged during startup and/or shutdown of the apparatus with the heating medium for heating the process gas flowing through the at least one process gas cooler and/or the at least one feed water preheater.

19. The apparatus as claimed in any of claims 15 to 17, wherein the heat exchanger is configured to transfer the thermal energy to the residual gas side between an absorption tower and a residual gas purification of the nitric acid plant.

20. The apparatus as claimed in any of claims 15 to 17, wherein the at least one residual gas turbine includes at least two stages.

* * * * *